United States Patent [19]

Welch

[11] 3,904,414

[45] Sept. 9, 1975

[54] PRECOATED DIAZOTYPE PHOTOCOPYING MATERIALS

[75] Inventor: Walter J. Welch, Binghamton, N.Y.

[73] Assignee: GAF Corporation, New York, N.Y.

[22] Filed: July 9, 1973

[21] Appl. No.: 377,394

Related U.S. Application Data

[63] Continuation of Ser. No. 183,715, Sept. 24, 1971, abandoned.

[52] U.S. Cl. .......................... 96/75; 96/49; 96/91 R

[51] Int. Cl.$^2$ ........................ G03C 1/60; G03C 1/54

[58] Field of Search .......................... 96/75, 91 R, 49

[56] References Cited

UNITED STATES PATENTS

| | | | |
|---|---|---|---|
| 2,523,882 | 9/1950 | Slifkin | 96/75 |
| 2,694,010 | 11/1954 | Botkin et al. | 96/75 |
| 2,953,471 | 9/1960 | Landau | 96/49 |
| 3,078,162 | 2/1963 | Bialczak et al. | 96/75 |
| 3,169,067 | 2/1965 | Berman et al. | 96/49 |
| 3,207,603 | 9/1965 | Sauit | 96/75 |
| 3,276,876 | 10/1966 | Welch | 96/75 |
| 3,284,201 | 11/1966 | Meijs et al. | 96/75 |
| 3,353,984 | 11/1967 | Landau | 96/75 |
| 3,434,838 | 3/1969 | Munder et al. | 96/75 |
| 3,469,984 | 9/1969 | Bialczak | 96/75 |
| 3,661,590 | 5/1972 | Murphy et al. | 96/49 |

FOREIGN PATENTS OR APPLICATIONS

| | | | |
|---|---|---|---|
| 571,802 | 9/1945 | United Kingdom | 96/91 R |

*Primary Examiner*—Charles L. Bowers, Jr.
*Attorney, Agent, or Firm*—Walter C. Kehm; James N. Blauvelt

[57] ABSTRACT

Light-sensitive diazotype photocopying materials comprising a base such as paper having thereon a precoat containing—in addition to a conventionally employed pigment and a binder—an inorganic water soluble salt of zinc, magnesium, aluminum or cadmium, and a two-component light-sensitive diazotype composition applied as coating to the precoat surface.

6 Claims, No Drawings

PRECOATED DIAZOTYPE PHOTOCOPYING MATERIALS

This is a continuation of application Ser. No. 183,715, filed Sept. 24, 1971, now abandoned.

This invention relates to light-sensitive diazotype photoprinting material having on a base sheet such as paper, plastic or the like, a precoat layer including a pigment and a binder therefor, and as a surface coating applied over the precoat layer, a two-component diazotype sensitizing composition.

As is well known in the art, such compositions contain essentially a light-senstive diazonium salt or complex, susceptible to decomposition on exposure to actinic light, and an azo coupling component, the mixture being acid stabilized against coupling until exposed and subjected to a development treatment which reduces the acidity so as to cause coupling of the diazonium compound and the azo coupling component so as to form an azo dye. Thus, upon image-wise exposure of such a layer to actinic light in accordance with an original pattern to be reproduced—e.g. by exposing the light under a translucent original having thereon an opaque image—the diazonium compound is decomposed in the light-struck areas but protected in the image areas, and upon development—e.g. by exposure to ammonia vapor—the residual diazonium compound couples with the azo coupling component to form an azo dye image of the original.

In addition to the diazonium compound and azo coupling component, two-component diazotype sensitizing compositions and the light-sensitive layers prepared therewith usually contain acid stabilizers such as citric, tartaric, boric, phosphoric, chlorobenzenesulfonic or 1,3,6-naphthalene sulfonic acid; wetting agents as saponin, alkylbenzenesulfonates or the like, colloids such as gelatin, gum arabic, methylcellulose, carboxymethylcellulose, etc., dispersed resins such as polyvinyl acetate, poly-methylmethacrylate, polystyrene or the like, and stabilizers or intensifiers for the image such as urea, thiourea, thiosinamine or N-allyl-N'-(2-hydroxyethyl)thiourea. It is also conventional to include water-soluble heavy metal salts—especially of the kind adapted to form a complex with the diazonium compound—e.g. zinc chloride, cadmium chloride, stannic chloride or nickel chloride—which tend to improve the stability of the diazonium compound and in some cases, to brighten the color of the developed image. However, since these salts tend to cause precipitation of the diazonium compound from the aqueous sensitizing composition, their concentration in such compositions is limited.

It is also conventional to provide a precoat on the base sheet as a foundation for the diazotype sensitizing composition. Such precoats ordinarily contain a pigment such as colloidal or finely divided silica, clay such as Bentonite or the like, with a dispersed resin such as a vinyl polymer (e.g. polyvinyl acetate, poly-methylmethacrylate or poly-styrene) which is deposited from an aqueous emulsion after application to the base sheet (cf. for example, U.S. Pat. No. 2,805,159). Such precoats tend to intensify the azo dye image—probably by insuring that the components of the sensitizing composition are more fully retained on the surface of the sheet.

It has been suggested in U.S. Pat. No. 2,953,471 to employ insoluble metal fluorides—especially of Ca, Ba, Sr, Mg, Al or Zn—as pigments in precoats of the aforesaid type, whereby superior print density, higher sensitivity and increased development rate are said to be obtained. Such fluorides have a solubility at room temperature of less than one part by weight per 100 parts of water. According to the disclosure of the reference patent, said fluorides are generally used in precoating dispersions at a concentration substantially higher than their solubility, and thus function for purposes of precoating essentially as insoluble pigments.

I have discovered that incorporation in a precoat for two-component diazotype photocopying material—particularly a precoat containing a binder and an inert pigment of the kind illustrated in U.S. Pat. No. 2,805,159, mentioned above — of a water-soluble salt of Zn, Mg, Al or Cd results in a surprising increase in image density and shelf life—particularly as compared with similar photocopying material in which the said water-soluble salt is not incorporated in the precoat. Moreover, incorporation of the water-soluble salt in the precoat rather than in the diazotype sensitizing composition avoids the tendency of such salts to cause precipitation — and consequent instability — of the diazonium compound in the sensitizing composition.

Thus, among the objects of my invention are the provision of improved two-component diazotype photoprinting material having, on a base sheet, a precoat layer containing—in addition to a binder and a pigment—a water-soluble salt of Zn, Mg, Al or Cd with an inorganic acid, and a two-component diazotype sensitizing composition coated upon the surface of said precoat layer, such material having surprisingly improved image density and increased shelf life; and further, the provision of a process for making such material involving the incorporation of the aforesaid water-soluble inorganic salt in the precoating composition, coating the latter on a base sheet such as paper or plastic, drying, and coating a two-component diazotype sensitizing composition on the precoated surface.

My invention will be more fully understood from the following examples wherein parts and percentages are by weight unless otherwise indicated.

EXAMPLE 1

A paper base sheet was coated uniformly with the following precoat composition:

| | | |
|---|---|---|
| Silica (average particle size 1.0 micron) | 6 | g. |
| Aqueous polyvinyl acetate emulsion (60% solids) | 10 | ml. |
| Aqueous paraffin wax emulsion (40% solids) | 2 | ml. |
| Urea | 5 | g. |
| Zinc chloride | 3 | g. |

Water to yield a volume of 100 ml.

After drying, the precoated surface was coated with a two-component diazotype sensitizing solution having the following composition:

| | | |
|---|---|---|
| Ethylene glycol | 3 | ml. |
| Isopropanol | 1 | ml. |
| Citric acid | 3.6 | g. |
| Urea | 4 | g. |
| Zinc chloride | 2 | g. |
| Aluminum sulfate | 2 | g. |
| Saponin | 0.1 | g. |
| 3-hydroxy-2-(N-propylmorpholinyl)-naphthamid | 1 | g. |
| 2,5-dibutoxy-4-morpholinylbenzene-diazonium chlorozincate | 1 | g. |

After drying, the resulting sensitized material is image-wise exposed to actinic light under a translucent original bearing an opaque image to be reproduced, and then developed by exposure to ammonia vapor. A high-density bright blue azo dye image is formed. The shelf life of the sensitized material was found to be excellent.

For purposes of comparison, sensitized material was prepared by the same procedure as outlined above, except that no zinc chloride was included in the precoat. The resulting image showed lower density and the material possessed poorer shelf life. Transfer of the zinc chloride included in the precoat to the sensitizing solution was not feasible, since the additional amount of salt caused precipitation of the diazonium compound serving as the sensitizer.

EXAMPLE 2

Paper base material was coated uniformly with the precoat composition of Example 1, and after drying, sensitized with a diazo sensitizing composition similar to that of Example 1, except that a similar quantity of 2,5-diethoxy-4-morpholinyl-benzenediazonium chlorozincate was substituted for the 2,5-dibutoxy sensitizer of Example 1. After drying, the resulting diazotype material was exposed image-wise to actinic light as in the preceding Example, and developed with ammonia vapor. A high-density bright blue azo dye image was formed, and again, the shelf life of the sensitized material was found to be excellent.

Similar light-sensitive diazotype material was prepared in the same manner except that zinc chloride was omitted from the precoat. The resulting material yielded lower image density and possessed poorer shelf life. Transfer of the zinc chloride from the precoat to the sensitizing composition yielded some improvement in image density and shelf life, but in each case, far inferior to that obtained in the material of the Example containing zinc chloride in the precoat.

EXAMPLE 3

Paper base material was precoated with a composition similar to that of the preceding Examples, except that 3 g. of magnesium chloride were substituted for the similar quantity of zinc chloride used above. The resulting material, when dried, was coated with the sensitizing composition of Example 1. After drying, the material was exposed image-wise to actinic light, and developed with moist ammonia vapor. A high-density bright blue azo dye image was formed, and the shelf life of the sensitized material was found to be excellent. Sensitized material similarly prepared except that magnesium chloride was omitted from the precoat was found to produce lower image density and brightness, and to possess very poor shelf life. Transfer of the magnesium chloride from the precoat to the sensitizing solution yielded much poorer image density, brightness and shelf life than the material of the Example.

As indicated above, the precoat compositions of this invention conventionally include a pigment and a binding agent, applied to the base sheet as an aqueous dispersion. Suitable pigments are white or light-colored insoluble, inert materials such as silica (their size ranging from colloidal dimensions to about 5 microns average particle size), clay such as Bentonite, aluminum oxide, titanium dioxide, zinc oxide, barium sulfate and the like. The binders are preferably latex emulsions of synthetic vinyl polymers such as polyvinyl acetate, polyvinyl chloride, arcylic and methacrylic acid ester polymers, butadiene polymers or the like. Alternatively, hydrophilic polymers can be used, such as gelatin, agar gum, carboxymethyl cellulose, polyvinyl alcohol, or the like. Pigment and binder are conventionally dispersed in water at a concentration suitable for coating—usually at a concentration of 10 – 25% of solids. Optionally, there may be included a minor proportion of finely divided wax particles deposited from an aqueous wax emulsion (illustrated by the paraffin wax emulsion of the Examples) to facilitate coating and provide a smoother surface.

The water-soluble salts of Zn, Mg, Al or Cd, included in the precoat according to this invention are inorganic salts having a solubility in water of at least 2 parts by weight per 100 parts at ordinary room temperature (20 – 25 degr. C.). The anions of these salts are such as to be inert toward the remaining components of the sensitizing composition and precoat—having thus no oxidizing or reducing activity under the conditions of coating and drying, and no tendency to react with the other components of the coating compositions. The chlorides and sulfates of Zn, Mg, Al and Cd are especially suitable in the precoat compositions of this invention.

Preferably, the aforesaid inorganic water-soluble salts of Zn, Mg, Al or Cd are employed in amounts corresponding to 10 – 25% by weight of the total solids in the precoat composition, and advantageously at a concentration of 2 – 5% by weigth of the aqueous composition as applied in the precoating operation. The precoat composition is uniformly applied by conventional coating equipment to the surface of the base sheet — e. g. paper or plastic — and dried. A two-component diazotype sensitizing composition is then coated upon the surface of the precoat, and dried to form the improved diazotype photoprinting material of this invention.

The two-component diazotype sensitizing compositions used in accordance with this invention are those conventionally employed. As diazo sensitizers, they may contain—for example—one or more of the following diazotized N-substituted p-phenylenediamine derivatives:

4-N,N-dimethylaminobenzenediazonium chlorozincote
4-N,N-diethylaminobenzenediazonium chlorozincate
4-N-ethyl-N-benzylaminobenzenediazonium chlorozincate
4-N-ethyl-N-(2′-hydroxyethyl)-amino-3-methylbenzenediazonium chlorozincote
4-N-(2′-hydroxyethyl)-amino-3-methylbenzenediazonium chlorozincate
4-benzoylamino-2,5-dimethoxybenzenediazonium chlorozincate
4-morpholinyl-2,5-diethoxybenzenediazonium chlorozincate
4-morpholinyl-2,5-dibutoxybenzenediazonium chlorozincate As azo coupling components, the diazotype sensitizing compositions may contain, for example, one or more of the following couplers:

resorcinol
phloroglucinol
2,3-dihydroxynaphthalene
2,3-dihydroxynaphthalene-6-sulfonic acid
3,3′-ethylenedioxy-bisphenol
3-hydroxy-2-(N-propylmorpholinyl)-naphthamid acetoacetanilide
1-phenyl-3-methyl-5-pyrazolone In addition, the diazotype sensitizing compositions advantageously contain stabilizers or intensifiers such as urea, thiourea, thiosinamine, or N-allyl-N′-(2-hydroxyethyl)-thiourea; stabilizing acids such as citric, tartaric, boric, phosphoric, chlorobenzene-sulfonic or naphthalene-1,3,6-trisulfonic acid; wetting agents such as saponin or alkylbenzenesulfonates; colloids such as gelatin, gum arabic, hydroxyethyl cellulose or polyvinyl-pyrrolidone; dispersed resinous polymers such as polyvinyl acetate, polymethylmethacrylate, polystyrene or the like; and heavy metal salts such as zinc chloride, stannic chloride, cadmium chloride or nickel chloride in amounts so limited as to avoid precipitation of the diazonium compound from the aqueous sensitizing composition.

The sensitized materials prepared in accordance with this invention are ready for use in photocopying after drying the sensitizing coating, yielding azo dye images having improved density, and possessing excellent shelf life during storage.

Variations which will be obvious to those skilled in the art may be made in the precoating ad sensitizing compositions hereinabove described without departing from the scope or spirit of this invention.

I claim:

1. Two component light-sensitive diazo-type photocopying material comprising, on a base sheet, a precoat layer consisting essentially of a polymeric binder, a pigment selected from the group consisting of finely divided silica having an average particle size of from about 1 to 5 microns, aluminum oxide, titanium dioxide, zinc oxide, barium sulfate, and Bentonite clay; and a water-soluble salt selected from the group consisting of magnesium chloride, magnesium sulfate, aluminum chloride, aluminum sulfate, cadmium chloride, and cadmium sulfate, said salt constituting 10–25% by weight of the solids of said precoat layer; and a two-component diazo-type sensitizing composition capable of being developed with ammonia and containing a diazonium compound, an azo-coupler, and an acidic stabilizer coated upon the surface of said precoat layer.

2. Two-component light-sensitive diazotype photocopying material as defined in claim 1, wherein said water-soluble inorganic salt is magnesium chloride.

3. Two-component light-sensitive diazotype photocopying material as defined in claim 1, wherein said pigment is finely divided silica.

4. Two-component light-sensitive diazotype photocopying material as defined in claim 1, wherein said binder is a vinyl polymer deposited from an aqueous emulsion thereof.

5. Two-component light-sensitive diazotype photocopying material as defined in claim 1, wherein said precoat includes finely divided wax particles deposited from an aqueous wax emulsion.

6. Two-component light-sensitive diazotype photocopying material as defined in claim 4, wherein said binder is polyvinyl acetate.

* * * * *